Aug. 24, 1943.  M. J. ZALESKE  2,327,951
COUPLING DEVICE
Filed Oct. 11, 1941
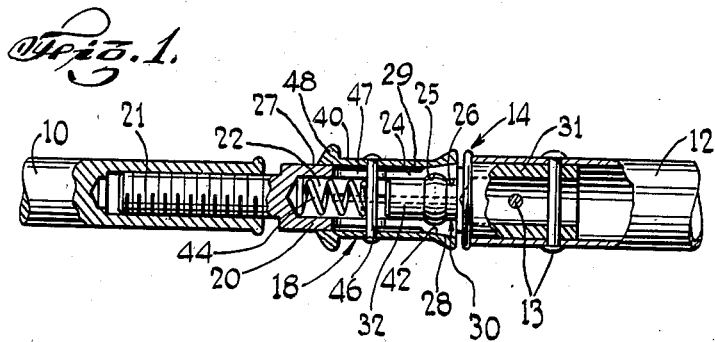
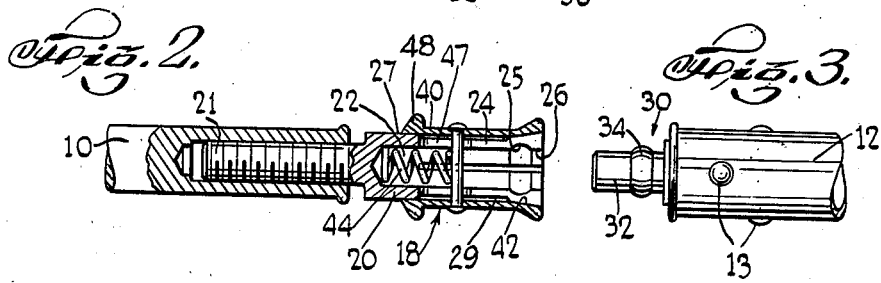
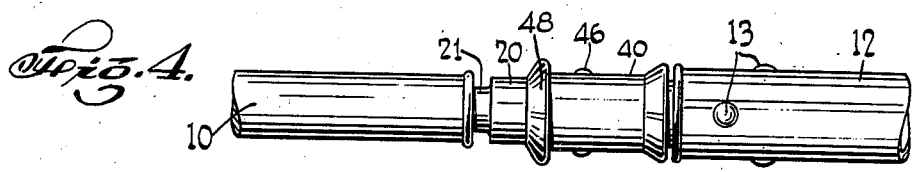
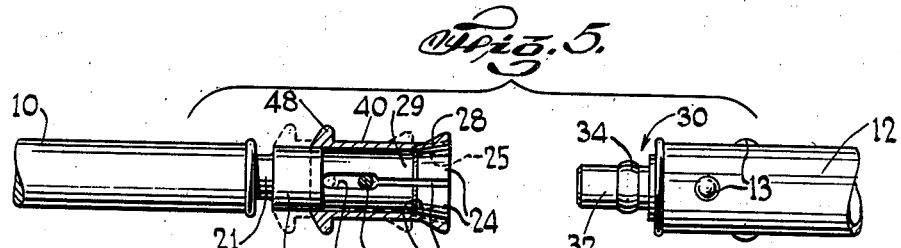
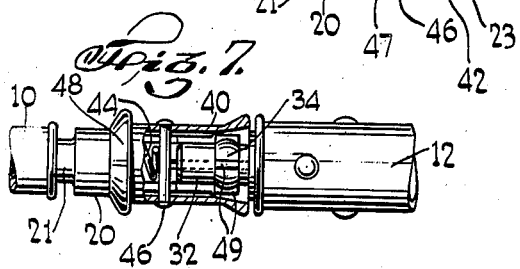
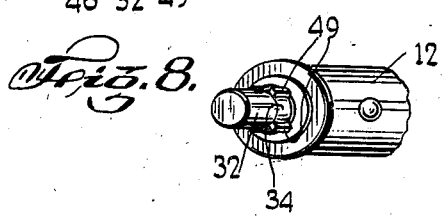
INVENTOR
MICHAEL J. ZALESKE
BY
Hammond Littell
ATTORNEYS Patented Aug. 24, 1943

2,327,951

UNITED STATES PATENT OFFICE 2,327,951

COUPLING DEVICE

Michael J. Zaleske, Union, N. J., assignor to Ideal Clamp Manufacturing Co., Inc., Brooklyn, N. Y., a corporation of New York Application October 11, 1941, Serial No. 414,547

9 Claims. (Cl. 287—104)

The object of this invention is to provide new and useful improvements in coupling devices for making quick connections and disconnections in control or connecting rods, tubes, cables, shafts and the like and for holding the coupled parts securely together when the coupling elements are connected.

Another object is to provide such devices which prevent relative turning movement between the parts when subject to torque.

The new couplings provided by my invention find important fields of use in aircraft and also in automobiles, machinery and other equipment where it is desirable to keep parts of the equipment connected securely in place but subject to removal and replacement with a minimum of effort and delay. For example, the control rods or tubes of aircraft engines usually extend through and are fastened to a "fire wall" or panel between the engine and the pilot cabin, in such manner that to remove and replace an engine heretofore has required considerable effort and delay in freeing and refastening the controls. By using the couplings of my invention as parts of such engine controls quick disconnections may be made in the controls without entailing any unscrewing or dismounting operations, so that the removal of an engine is greatly expedited; and by providing the control rods or tubes of replacement engines with similar coupling elements a quick yet secure reconnection of controls may be effected whenever replacement engines are installed.

The various new features and advantages of my invention and a suitable manner of making and using the same will be apparent from the following description of illustrative embodiments thereof, when considered in connection with the accompanying drawing, wherein Figure 1 is a longitudinal section showing two parts of a control system connected together by means of a coupling device embodying my invention;

Figure 2 is a vertical section through the socket member of Figure 1;

Figure 3 is an elevation showing the plug member of the coupling;

Figure 4 is an elevation of the assembly of Figure 1;

Figure 5 is an exploded view, partly in section, showing the coupling members in disconnected relation;

Figure 6 is a perspective view of the socket member body;

Figure 7 is an elevation, partly in vertical section, showing another embodiment of my invention wherein the coupling is provided with means to prevent relative turning movement between the coupled parts; and Figure 8 is a perspective view of the plug member of Figure 7.

Referring first to the embodiment of Figures 1 to 6, I have there illustrated a control rod end 10 that is to be coupled to the end 12 of an aircraft engine control tube. The new coupling device 14 is provided to connect and disconnect these parts. The coupling itself consists essentially of two separable mating parts—a socket member 18 and a plug member 30. The illustrated socket member has a body 20 with an integral screw-threaded shank 21 which may be screwed into the rod end 10. The illustrated plug member has a cylindrical shank 31 which extends into the tube end 12 and is secured thereto by means of pins 13. It will be understood, of course, that this illustrative arrangement may be reversed and that various other means may be used for securing the plug and socket members to the respective parts which they are to couple together.

Referring particularly to Figures 1, 2 and 6, the body 20 has an axial bore 22 therein, and the wall of this bore is slitted longitudinally at 23 to provide a plurality of strong, resilient integral fingers 24. The fingers 24 therefore define most of the bore or socket 22, which is open at its end; and the resiliency of these fingers enables the socket opening to be enlarged by expanding the finger ends outwardly from their normal position. In addition, the insides of the fingers are recessed, as at 25, to define an annular groove or receptacle for receiving a complementary part of the plug member, as hereinafter described. The metal between the groove 25 and the ends of the fingers obviously provides a discontinuous annular lip 26 having a radius smaller than the radius of the groove.

The plug member 30 comprises an elongated plug or stem 32 of such shape and size as to slide into and fit within the bore or socket 22 of the socket member. Intermediate the end and the base of this stem there is an enlarged hump or step 34 which is made of such shape and size that it will fit snugly within groove 25 when the two members are coupled together. The hump 34 is formed so that it may act as a cam and spread the fingers whenever the stem 32 is forced into or out of the socket 22.

A sleeve 40 is fitted on the socket member for axial sliding movement on an outer bearing surface 27 thereof. The end portions of the fingers 24 have outer surfaces 28 which are adapted to be engaged collectively by a complementary inside surface 42 at the end portion of sleeve 40. When sleeve 40 is disposed so that its surface 42 engages surfaces 28 the sleeve obviously confines the ends of the fingers and prevents them from being sprung outwardly in radial direction. Accordingly, when the sleeve is so disposed it is impossible to couple the plug member with the socket member; or if the plug member already has been coupled with the socket member the parts cannot be separated because the sleeve 40 prevents fingers 24 from being sprung outwardly to the extent necessary to allow step 34 to pass lip 26.

It will be understood, however, that when the sleeve 40 is moved axially away from its locking or operative position, the confining surface 42 thereof lies in spaced relation to cut-away portions 29 of the fingers, and hence the sleeve becomes inoperative. The fingers are then free to be sprung outwardly to a certain extent at their ends, against their normal spring tension, so that the stem of the plug member then may be inserted into or withdrawn from the socket member.

With this arrangement, yieldable means are provided for normally holding the sleeve in its locking or operative position, while still allowing it to be forced away from operative position when connecting or disconnecting the coupling. For example, a compression spring 44 may be located in the bore 22 so as to press against a pin 46 extending through sleeve 40. Two oppositely disposed slits 23 may be large enough to accommodate and permit axial movement of pin 46; or parts of such slits may be enlarged for the same purpose, as indicated at 47.

It will be evident that when the coupling is connected, as illustrated in Figures 1 and 4, the fingers 24 hold themselves in embracing relation to the step 34 of stem 32, and the spring 44 holds the sleeve 40 in locking position so that there can be no outward springing movement of the fingers to permit withdrawal of the stem. Consequently, there can be no relative linear movement between the plug and socket members or between the parts to which they may be secured. To disconnect the coupling it is necessary merely to move the sleeve backwardly against spring 44 and thereafter to pull the plug and socket members apart with a force sufficient to pass the hump 34 beneath lip 26. To reconnect the coupling it is necessary merely to retract the sleeve again as indicated by dotted lines in Figure 5, and to insert the plug member stem into the socket member while the sleeve is retracted. A flange 48 preferably is provided on sleeve 40, allowing it to be grasped by the fingers and moved against spring 44.

The size of the improved couplings herein disclosed and the materials used in making them may be varied according to the strength required and the conditions to be encountered in their use. Great strength, however, may be obtained from a coupling of small diameter. For example, a coupling having a maximum diameter of ⅝" (at the flange 48), and having a hump .02" higher than the adjacent stem surface 32, has been made to withstand strains in excess of four thousand pounds by the use of heat treated, .35% C. Steel having a Rockwell "C" hardness of 38.

Another advantage of the couplings provided by this invention is that they may be made with dimensional tolerances of .002" or more, so that very precise manufacturing operations are not required. Yet various plug and socket members may be used interchangeably. When the new couplings are used in aircraft engine controls, for example, the control rods may be provided with the new socket members, and the control tubes leading from several engines may be provided with complementary plug members, so that any of the engines may be removed and replaced by another engine without requiring any unfastening or dismounting operations on the controls other than quick disconnections and reconnections of the couplings.

In Figures 7 and 8 of the drawing I have illustrated another embodiment of my invention, wherein the coupling device is constructed in a manner similar to the embodiment of Figures 1 to 6, except that it is provided with means for preventing relative turning movement between the plug and socket members. This is accomplished readily by providing the step 34 of the plug member with spaced ribs 49 of such size and shape as to be confined in the slits 23 between fingers 24 when the members are coupled together. It will be evident that this structure prevents relative turning movement between the members and that couplings embodying this feature may be used to advantage in rods, tubes, shafts and the like where the parts coupled together are required to be rotated.

As will be understood by those skilled in the are, my invention may be embodied in various forms and constructions and applied to various uses without restriction to details of the illustrative embodiments herein set forth. I therefore desire that my invention be accorded a scope fully commensurate with its contributions to the art, as limited only by the fair requirements of the appended claims.

I claim:

1. A coupling device comprising a body member having a plurality of integral, resilient fingers which normally hold themselves in substantially parallel relation and define a normally contracted socket, transverse grooves on the insides of said fingers between the extremities of said socket, a plug member having a stem shaped to fit into said socket and hump means on said stem to project into said grooves when the stem is fitted into said socket, said hump means being operative to spring said fingers outwardly as said stem is inserted into or withdrawn from said socket, means slidably mounted on said body member for movement from and to a position confining said fingers against such outward movement, and means yieldably holding said last-recited means in its confining position.

2. A coupling device comprising a plug member having a cylindrical stem with an enlargement thereon, a socket member including a body portion having a plurality of integral, resilient fingers defining a socket to receive said stem and formed to embrace and hold said enlargement, said fingers normally resting in a contracted parallel relation and being springable outwardly by movement of said enlargement into said socket, a sleeve slidable on said body portion to and away from an operative position confining the end portions of said fingers against outward movement, and spring means in said body portion normally holding said sleeve in its operative position.

3. A coupling device as described in claim 1, said plug member having radial projections on its stem to fit between said fingers and prevent relative turning movement between the members.

4. In a coupling device comprising a plug member adapted to be secured to one part and a socket member adapted to be secured to another part that is to be coupled with said one part, a socket member including a body having a plurality of integral, resilient fingers defining an axial bore with an open end, a plug member having a stem shaped to fit into said socket, complementary hump and groove means on said stem and within said socket, respectively, for holding said members in coupled relation, said hump means being inclined at its sides so as to cam said fingers outwardly when said members are coupled or uncoupled, and a sleeve slidable on said body to and from a position preventing outward movement of said fingers.

5. A coupling device as described in claim 4, said plug member having radial projections on its stem to fit between said fingers and prevent relative turning movement between the members.

6. In a coupling device for making quick connections and disconnections between two parts to be coupled together, a socket member comprising a cylindrical body having means at one end to secure the same to one of such parts and a plurality of integral, resilient fingers normally held in a contracted position defining an axial socket that is open at the other end of said body and shaped to receive the stem of a cooperating plug member to be secured to the other of such parts, the insides of said fingers having recesses therein near said other end formed to interfit with complementary hump means on such stem, a sleeve slidable on said body to and from a position confining said fingers against outward springing movement, and a spring carried by said body for normally holding said sleeve in said confining position.

7. In a coupling device, a coupling member comprising a cylindrical body having means at one end thereof to secure the same to a part to be coupled and a plurality of integral, parallel, resilient fingers at the other end thereof and defining therewith an axial, cylindrical socket open at said other end, the insides of said fingers having recesses spaced from the finger ends to interfit with hump means on a mating coupling member, a bearing surface on the outside of said body, a sleeve slidable axially on said bearing surface, and outside surfaces near the ends of said fingers adapted to be engaged and confined by said sleeve, said fingers having outsides of reduced radius between said outside surfaces and said bearing surface.

8. In a coupling device, a coupling member comprising a cylindrical body having means at one end thereof to secure the same to a part to be coupled and a plurality of integral, parallel, resilient fingers at the other end thereof and defining therewith an axial, cylindrical socket open at said other end, the insides of said fingers having recesses spaced from the finger ends to interfit with hump means on a mating coupling member, a bearing surface on the outside of said body, outside tapered surfaces near the ends of said fingers, a sleeve surrounding said body to slide axially on said bearing surface and having an end portion formed to engage said tapered surfaces and confine the finger ends against outward movement when the sleeve is in operative position, and the outsides of said fingers between said bearing surface and said tapered surfaces having a reduced radius to allow outward movement of the finger ends when the sleeve is disposed away from operative position.

9. In a coupling device, a coupling member comprising a cylindrical body having means at one end thereof to secure the same to a part to be coupled and a plurality of integral, parallel, resilient fingers at the other end thereof and defining therewith an axial, cylindrical socket open at said other end, the insides of said fingers having recesses spaced from the finger ends to interfit with hump means on a mating coupling member, a bearing surface on the outside of said body, outside tapered surfaces near the ends of said fingers, a sleeve surrounding said body to slide axially on said bearing surface and having an end portion formed to engage said tapered surfaces and confine the finger ends against outward movement when the sleeve is in operative position, a pin secured to said sleeve and extending between such fingers into said socket, and a spring in the base of said socket pressing against said pin to hold said sleeve normally in operative position.

MICHAEL J. ZALESKE.